United States Patent [19]
James et al.

[11] 4,329,058
[45] May 11, 1982

[54] METHOD AND APPARATUS FOR A FABRY-PEROT MULTIPLE BEAM FRINGE SENSOR

[75] Inventors: Kenneth A. James, Corona Del Mar; William H. Quick, La Habra Heights; Virgil H. Strahan, Orange, all of Calif.

[73] Assignee: Rockwell International Corporation, El Segundo, Calif.

[21] Appl. No.: 5,265

[22] Filed: Jan. 22, 1979

[51] Int. Cl.³ .............................................. G01B 11/02
[52] U.S. Cl. .................................. 356/352; 356/361; 356/357
[58] Field of Search ................. 356/357, 358, 361, 352

[56] References Cited
U.S. PATENT DOCUMENTS
4,171,915 10/1979 Hesselink ............................ 356/361

*Primary Examiner*—Craig E. Church
*Attorney, Agent, or Firm*—H. Fredrick Hamann; Morland C. Fischer

[57] ABSTRACT

A method and the resulting apparatus for implementing a unique multiple beam fringe sensor that is adapted to be interfaced with a low cost, compact fiber optic transmission system in order to provide an accurate digital representation of a physical parameter (e.g. temperature) of a remote sample. The sensor is fabricated so as to include a Fabry-Perot gap formed between the ends of two mated optical fibers. By examining the optical characteristics of light that is transmitted through the Fabry-Perot sensor gap, an indication of gap width can be ascertained. Accordingly, a change in Fabry-Perot sensor gap width is related to a change in the particular physical parameter to be measured.

17 Claims, 10 Drawing Figures

METHOD AND APPARATUS FOR A FABRY-PEROT MULTIPLE BEAM FRINGE SENSOR

The invention described herein was made in the performance of work done under NASA Contract No. NAS3-21005 and is subject to the provisions of Section 305 of the National Aeronautics and Space Act of 1958 (72 Stat. 435; 42 USC 2457).

BACKGROUND OF THE INVENTION

1. Field of the Invention

This invention relates to a method for fabricating and to the resulting apparatus for implementing a unique Fabry-Perot multiple beam fringe sensor that is suitable to provide an accurate digital representation of a physical parameter.

2. Prior Art

Conventional sensors which are adapted to measure various physical characteristics of a sample typically provide an analog output signal. Consequently, should a digital representation of an output signal be desired, relatively expensive and space consuming analog-to-digital equipment is required. Moreover, such conventional analog sensors are limited in application, because of their inherently large size and slow response time. Moreover, either complex transmission lines or signal conversion apparatus is typically required when the sensor must collect information from a remote sample. Hence, prior art transmission systems that have heretofore been interfaced with sensors of the prior art are relatively expensive to fabricate, are not capable of carrying sufficiently wide bandwidth signals, lack immunity to electro-magnetic and/or electro-static interferences, and require numerous interfacing apparatus.

An example of an optical sensor that is interfaced with a fiber optic transmission system to provide accurate digital representations of a physical parameter from a remote sample can be found in U.S. application Ser. No. 928,223 entitled FIBER OPTIC TEMPERATURE SENSOR, filed July 26, 1978. However, nothing is known in the prior art which shows or suggests the claimed method for fabricating a unique multiple beam fringe sensor that includes a Fabry-Perot cavity, so that the optical characteristics of light transmitted therethrough provide an indication of the change of a physical parameter to be measured. While Fabry-Perot techniques have been previously utilized in non-sensing applications (such as in the construction of a laser), nothing is known in the prior art which applies Fabry-Perot optical principles to an apparatus for sensing physical parameters, such as that disclosed and claimed below.

SUMMARY OF THE INVENTION

Briefly, and in general terms, a method for fabricating a unique Fabry-Perot multiple beam fringe sensor is disclosed, which sensor has particular application for providing a digital representation of the physical parameters of a remote sample. in accordance with the present invention, the preferred method of fabrication includes the steps of spherically terminating one end of each of a pair of suitable glass or silica optical fibers. Each of the spherical ends are polished so that enlarged flat surfaces are respectively formed, whereby the end of each optical fiber is hemispherically terminated. A raised cylindrical contact is formed on one of the polished flat surfaces of a first of the pair of hemispherically terminated optical fibers. A hollow spacer is applied around the periphery of the raised cylindrical contact. In one preferred embodiment, it is desirable that the materials used to form the cylindrical contact and the hollow spacer have different temperature coefficients of expansion. The raised cylindrical contact is shortened, whereby the end surface thereof is recessed with respect to the end surface of the spacer. The sensor is assembled by mating the end surface of the spacer of the first optical fiber with the polished, flat end surface of the second of the pair of optical fibers, such that a narrow Fabry-Perot gap is formed between the respective ends of the shortened cylindrical contact and the second optical fiber.

The multiple beam fringe sensor of the present invention is interfaced with a fiber optic transmission and detection system so that light is transmitted through the narrow Fabry-Perot gap. The sensor operates in a manner whereby the Fabry-Perot gap causes a plurality of reflections and splittings of a single beam of incident light, such that constructive and destructive interference of the components of the incident light beam may occur numerous times. The instant sensor has the desirable characteristic that the spectral characteristics of the output light signal are directly related to both the known wavelengths of the incident light beam and to the dimensions of the gap. By decoding the information transmitted by the sensor optical output signals, a digital indication of changing Fabry-Perot gap width can be obtained, which gap width can provide a representation of the change of a physical parameter, such as pressure, temperature, and the like.

DESCRIPTION OF THE PREFERRED EMBODIMENT

Figure 1:
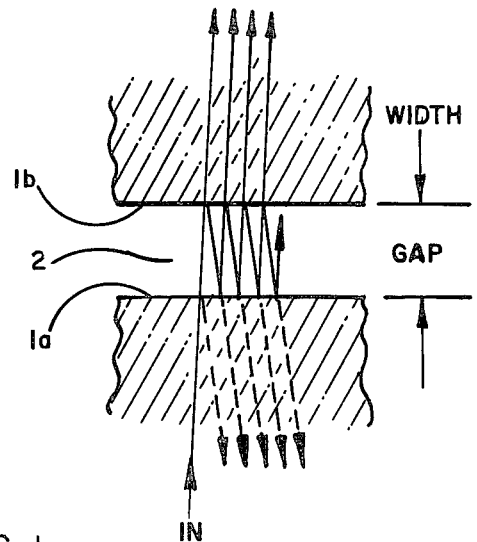
FIG. 1 shows the formation of and the optical principles associated with a Fabry-Perot cavity or gap.

Referring to FIG. 1 of the drawings, an incident beam of light, designated IN, is shown being partially transmitted through first and second optically flat and parallel surfaces 1a and 1b and partially reflected a plurality of times within a Fabry-Perot cavity or gap 2 that is formed between surfaces 1a and 1b. Inasmuch as an inherent phase reversal occurs when light is reflected from a more dense medium (i.e. through surfaces 1a and 1b to a less dense medium (i.e. to optical gap 2), it is possible for the main reflected light beams (shown dotted) to cancel in a gap 2 having a particularly dimensioned width that is equal to a multiple of half wavelengths of the incident light. The light beams that are transmitted through Fabry-Perot gap 2 and surfaces 1a and 1b undergo an even number of reflections, so that, in the event of such a phase reversal, the even number of phase reversals produces no net phase reversal. Moreover, the components of light being transmitted through the gap 2 having a width equal to a half wavelength multiple are in supportive phase with one another, so that light transmission through gap 2 occurs. When the reflectivity at the surface 1a or 1b of a relatively dense material is high, a very large number of reflections is required before the amplitudes of the transmitted light beams add up to a resultant amplitude that is close to the amplitude of the incident beam of light IN. As a result, under conditions of high reflectivity, even a very small variation in the frequency of light causes the transmission characteristics thereof to decrease dramatically. Hence, in view of the foregoing well known principles, devices are available with a very narrow transmission band relative to the wavelength of light. One such device is known to those skilled in the art as a Fabry-Perot etalon when the gap 2 between surfaces 1a and 1b is maintained constant. However, the aforementioned device is, otherwise, known as a Fabry-Perot interferometer when the gap 2 between surfaces 1a and 1b is mechanically varied. Additional information regarding Fabry-Perot principles in general can be found in the Handbook of Physics, 2d, published by McGraw-Hill, 1967, Section 7, Chapter 5, Part 6.

In accordance with the present invention, FIG. 2 of the drawings is illustrative of the preferred steps of a method, which uses the theory enumerated while referring to FIG. 1, for fabricating a Fabry-Perot multiple beam fringe sensor that can be utilized within a compact fiber optic transmission system to provide an accurate digital indication of remote temperatures, pressures, and other physical parameters. Referring initially to FIG. 2(a) of the drawings, two well known optical glass or silica fibers 10 and 12 are shown, each fiber having one end which is spherically terminated. By way of example, a suitable supply of heat is applied to one end of each of optical fibers 10 and 12 until fused spheres 14 and 16 are respectively formed thereat. FIG. 2(b) is illustrative of a step of polishing each of the spherical ends 14 and 16 of optical fibers 10 and 12 so that enlarged flat surfaces 18 and 20 are respectively formed. Flat surfaces 18 and 20 are perpendicularly aligned with the longitudinal axes of corresponding optical fibers 10 and 12, whereby each fiber is hemispherically terminated. FIG. 2(c) is representative of a step of forming a raised cylindrical contact 22 on one of the polished flat surfaces 18 or 20 of corresponding optical fiber 10 or 12. By way of example, contact 22 may be formed by cementing a small, solid cylindrical piece of glass, quartz, or other suitable material having light transmissive properties that are similar to those of the flat polished surface 18 of optical fiber 10. As an alternative step, the polished surface 18 of optical fiber 10 may be ground, according to conventional procedures, until the raised, cylindrical contact 22 extends therefrom. In a preferred embodiment, the longitudinal axes of optical fiber 10 and raised cylindrical contact 22 are coincidentally aligned with one another. FIG. 2(d) indicates a step of applying (such as by means of cement, metal fusion, or the like) a hollow spacer 24 around the periphery of raised cylindrical contact 22. By way of example, spacer 24 may consist of a suitable metallic material. However, the materials used to form contact 22 and spacer 24 must have different temperature coefficients of expansion. FIG. 2(e) is illustrative of a step of shortening the raised cylindrical contact 22. Raised contact 22 may be polished or ground down, whereby the end surface thereof is recessed with respect to the end surface of spacer 24. In order to provide an accurate digital representation of a physical parameter, it is essential that the end surfaces of shortened cylindrical contact 22 and spacer 24 are maintained both very flat and in parallel alignment with one another to enable a suitable Fabry-Perot gap to be formed.

In one preferred embodiment of the present invention, a technique by which to insure the desired flat and parallel characteristics of the end surfaces of cylindrical contact 22 and spacer 24 is disclosed as follows. Referring once again to FIG. 2(d), prior to the step of shortening raised cylindrical contact 22, the end surfaces of contact 22 and spacer 24 are finely polished so that a single plane exists thereacross. It is desirable for the planar end surfaces of contact 22 and spacer 24 to be made extremely flat, inasmuch as the number of light reflections that occur in a Fabry-Perot interferometer or etalon increase according to the precision by which the end surfaces are characteristically matched. By way of particular example, a flatness of 1/20 to 1/100 of a wavelength is suitable for many Fabry-Perot applications. By the nature of the small size which characterizes the multiple-beam fringe sensor to be disclosed herein, random flatness variations over the planar end surfaces of raised contact 22 and spacer 24 can be minimized, so that relatively less area is available for degrading variations. After the end surfaces of raised contact 22 and spacer 24 have been polished so as to precisely terminate along a single plane, raised contact 22 is, thereafter, shortened, as previously disclosed while referring to FIG. 2(e) of the drawings.

According to another preferred embodiment of the present invention, a technique for shortening cylindrical contact 22, so that the end surface thereof is recessed with respect to that of spacer 24, is described as follows. The raised contact 22 is initially ground or polished down to a suitable height at a reduced temperature, which temperature is lower than any of those to which the sensor is expected to be exposed. By virtue of the difference in expansion coefficients between glass or quartz contact 22 and metallic spacer 24, a height differential is produced when the present fringe sensor is exposed to higher operating temperatures. Alternatively, another technique by which to achieve the height differential between the end surfaces of contact 22 and spacer 24 includes a step of utilizing a conventional vapor deposition process. More particularly, a suitable metallic material is vapor deposited around the outer periphery of cylindrical contact 22 until a desired spacer height is obtained.

Figure 2A:
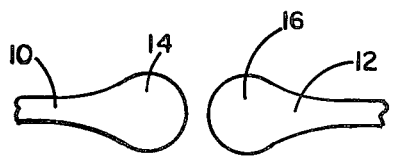
FIGS. 2(a)-(f) are illustrative of the steps of the preferred method utilized to form the Fabry-Perot multiple beam fringe sensor of the present invention.
Figure 2B:
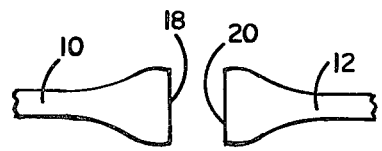
Figure 2C:
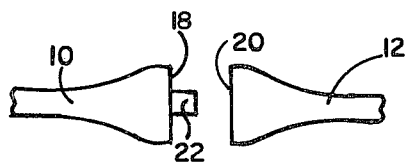
Figure 2D:
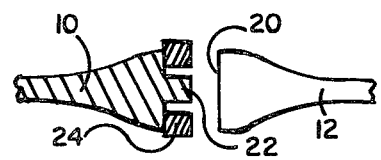
Figure 2E:
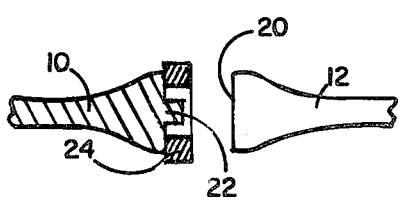
Figure 2F:
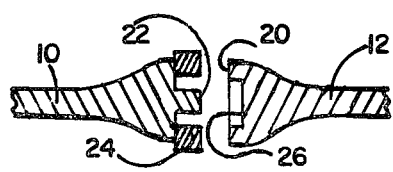

Yet another technique which includes utilizing a vapor deposition process for achieving the height differential between contact 22 and spacer 24 comprises the step of depositing a suitable metallic spacer material on the flat end surface 20 of matching optical fiber 12. This optional technique is illustrated in FIG. 2(f) of the drawings. More particularly, spacer material is selectively deposited around the perimeter of the flat end surface 20 of matching optical fiber 12 until a depression 26 is formed (such as by conventional photolithographic techniques) at the center thereof. Depression 26 is dimensioned and aligned so as to be adapted to receive the cylindrical contact 22 therein when end surface 20 of optical fiber 12 is mated with spacer 24 of optical fiber 10.

Figure 3:
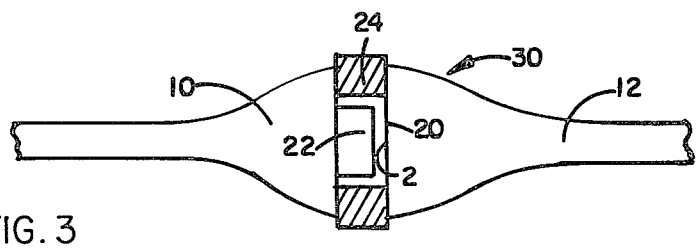
FIG. 3 shows the multiple beam fringe sensor assembled in accordance with the steps of the method disclosed while referring to FIGS. 2(a)-(f) of the drawings.

FIG. 3 shows a unique multiple-beam fringe sensor 30 formed in accordance with the steps of the method disclosed while referring to FIGS. 2(a)-2(e) of the drawings. In the assembled relationship, the polished, flat end 20 of optical fiber 12 is cemented directly to the flat end surface of spacer 24. In the assembled relationship of FIG. 3, a Fabry-Perot gap 2 surrounds contact 22, inasmuch as contact 22 is recessed relative to the spacer 24, as previously disclosed. The width of gap 2 is defined as the distance between the flat end surfaces of contact 22 and optical fiber 12. The sensitivity of sensor 30 is dependent upon the ratio of Fabry-Perot gap width to the height of spacer 24. Gap 2 corresponds to that which was previously illustrated and described when referring to FIG. 1 of the drawings.

The multiple-beam fringe sensor 30 of the present invention has particular application as a temperature sensor, wherein spacer 24 is fabricated from a metal or other suitable material having an expansion coefficient larger than that of the optical glass or quartz from which optical fibers 10 and 12 are fabricated. However, it is to be understood that the multiple-beam fringe sensor 30 of FIG. 3 also has particular application as a pressure sensor, wherein spacer 24 is fabricated from an elastic material that is adapted to deform when exposed to anticipated pressure ranges. In this last-mentioned pressure sensor application, the flat optical end surfaces of the sensor fibers 10 and 12 must be maintained at a high degree of parallelism with respect to one another to obtain the desired Fabry-Perot effect. Yet another application of the multiple-beam fringe sensor 30 of FIG. 3 is that of a gas-density sensor, wherein the density of gas is measured according to the change in the index of refraction of light passing therethrough. In operation, gas, admitted to the sensor gap 2 which surrounds cylindrical contact 22, causes the optical path length of the incident light to change according to the density and index of refraction of the particular gas sample. In this application, however, spacer 24 and optical fiber 10 are fabricated from an identical material. More particularly, a gas density sensor formed in accordance with the teachings above would preferably include a fixed Fabry-Perot gap, whereby the index of refraction of a gas sample could be determined, and a tunable Fabry-Perot gap, whereby the absorption characteristics and chemical constituency of the gas sample could also be determined.

Figure 4:
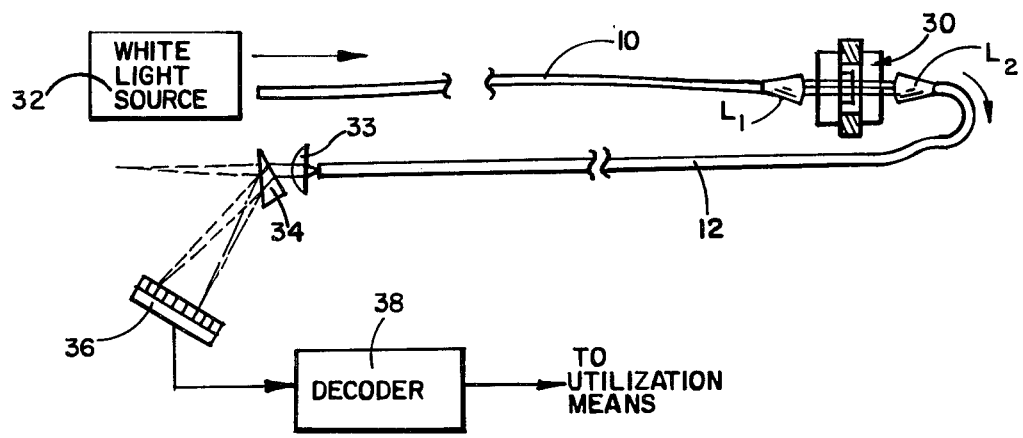
FIG. 4 shows the interconnection of the Fabry-Perot sensor of FIG. 3 with a compact fiber optic transmission system for measuring physical parameters of remote samples.

A compact, inexpensive fiber optic transmission system that incorporates the multiple-beam fringe sensor 30 of FIG. 3 to provide digital representations of physical parameters is illustrated in FIG. 4 of the drawings. One end of optical fiber 10 is connected to a source 32 of white light. The second end of fiber 10 terminates in the formation of sensor 30 via an input lens $L_1$. One end of optical fiber 12 also terminates in the formation of sensor 30 via an output lens $L_2$, as previously disclosed. Lenses $L_1$ and $L_2$ can be formed integrally with the ends of fibers 10 and 12, if so desired. The second end of fiber 12 is aligned with a suitable focusing lens 33. Output light signals that are transmitted from sensor 30 via fiber 12 and lens 33 are focused on a suitable light dispersing means, such as a prism 34, for breaking up the spectrum of the optical information signals provided by sensor 30. A suitable photo-detector 36 is interfaced with prism 34 so as to detect and amplify the spectrum of the light signals emitted therefrom. By way of example, photo-detector 36 comprises a conventional linear array of charge coupled devices. Particular charge coupled devices of photo-detector 36 are selectively activated by light that is dispersed by prism 34, in order to provide an electrical representation of a particular physical parameter (e.g. temperature) to be measured, depending upon the wavelength or color of the transmitted optical information signals. The output of photo-detector 36 is connected to the input of a decoder 38. Decoder 38 is adapted to receive the output electrical signals from photo-detector 36, so that a digital representation of the physical parameter may be supplied, in a well known coded signal format, to a utilization means, such as a micro-processor, a computer, or the like, for the purpose of data storage or for further processing. More particularly, a microprocessor may store an algorithm required for decoding the electrical output signals from photo-detector 36. Alternatively, the decoding process could be combined as part of the overall function of a larger computer system.

Figure 5:
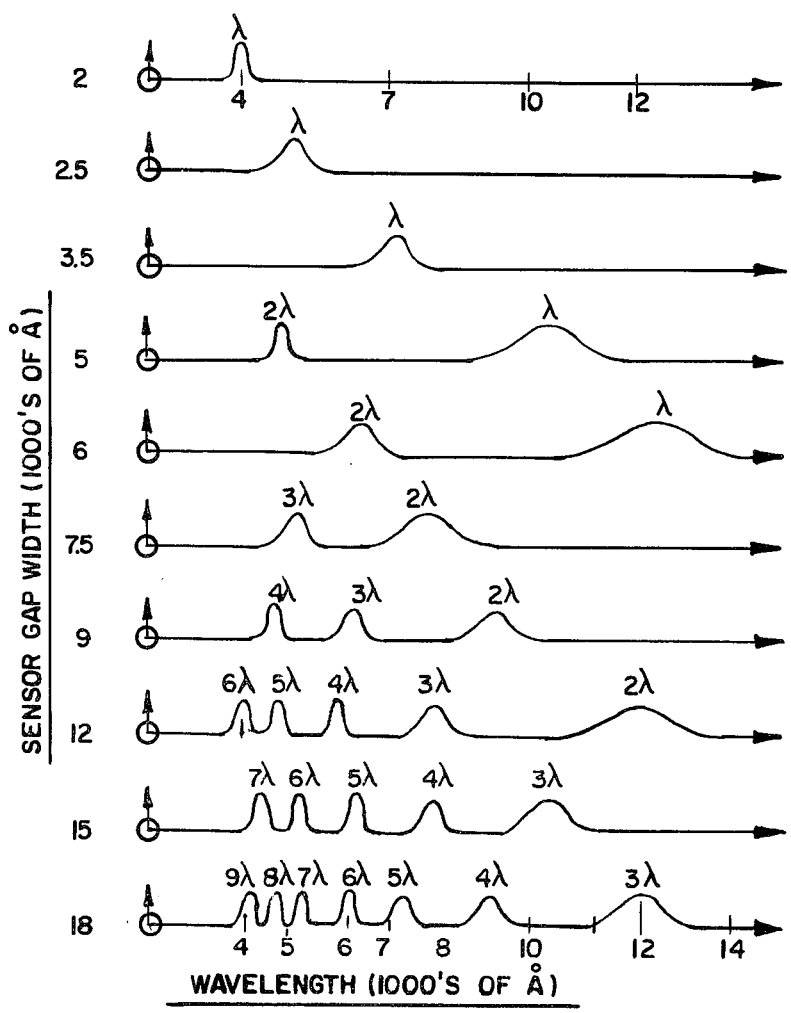
FIG. 5 is graphically indicative of the transmitted light spectra at various Fabry-Perot sensor gap widths when an incident light source is applied to the transmission system of FIG. 4.

By employing a white light source 32 to provide incident light signals to the multiple-beam fringe sensor 30 of the fiber optic transmission system in FIG. 4, only those particular wavelengths that are equal to the half wavelength multiples of Fabry-Perot sensor gap width are transmitted to photo-detector means 36. The transmitted light spectra at various sensor gap widths is represented in FIG. 5 of the drawings. FIG. 5 indicates that the wavelengths of the transmitted incident white light increase proportionately with an increase in the sensor gap width. Moreover, as the wavelength of the transmitted light surpasses the visible region and enters the infrared region, a new spectral line appears in the visible region, which line tends to move towards longer wavelengths with increasing Fabry-Perot sensor gap width. This aforementioned pattern is repeated as the sensor gap continues to increase in width. Although, at larger gap widths, the spectral lines moving across the spectrum are a repetition of lines which move across the spectrum at smaller gap widths, the entire spectrum at any one gap width is not duplicated, inasmuch as additional spectral lines appear during the repetitions. By way of example, at a sensor gap width of 6000 Å, a 2λ line appears at a wavelength of 6000 Å. At a gap width of 9000 Å, a 3λ line also appears at a wavelength of 6000 Å. However, at the 9000 Å gap width, 4λ and 2λ lines also appear at wavelengths of 4500 Å and 9000 Å, respectively, so as to particularly distinguish a 9000 Å sensor gap width from a 6000 Å sensor gap width. As a further example, at a sensor gap width of 12,000 Å, a 4λ line appears at a wavelength of 6000 Å. However, the remainder of the 12,000 Å pattern is, accordingly, clearly distinguishable from the corresponding patterns at gap widths of 9000 Å and 6000 Å.

By virtue of the foregoing technique for sensing a change in the optical characteristics of sensor 30 when illuminated by a white light source, output information signals from decoder 38 (in FIG. 4) can provide an accurate indication of the Fabry-Perot gap width of sensor 30 over a range of several wavelengths. Therefore, after sensor 30 is calibrated to account for various initial conditions, the indicated change of Fabry-Perot gap width can be proportional to the change in a particular physical parameter (e.g. temperature) to be measured.

It will be apparent that while a preferred embodiment of the invention has been shown and described, various modifications and changes may be made without departing from the true spirit and scope of the invention. For example, the disclosed method of fabrication of the present invention and the unique Fabry-Perot sensor resulting therefrom have particular application to avionics, medicine, and to any other use where an accurate digital representation of a physical measurement is desired.

Having thus set forth a preferred embodiment of the present invention, what is claimed is:

1. A method for making an apparatus for optically sensing a physical parameter, said method comprising the steps of:
   forming optically flat surfaces on one end of each of a pair of optical fibers,
   forming a raised contact means on the flat end surface of a first of said pair of optical fibers,
   applying a first spacer means around said raised contact means,
   shortening said raised contact means, so that said contact means is recessed with respect to said first spacer means,
   mating said first spacer means of said first optical fiber to the flat end surface of the second of said pair of optical fibers, so that a Fabry-Perot gap is formed between said recessed contact means and the flat end surface of said second optical fiber, and
   transmitting light through said Fabry-Perot gap and examining the optical characteristics of said light for providing an indication of the physical parameter to be sensed.

2. The method recited in claim 1, including the additional step of shortening said raised contact means at a lower temperature than any of those to which said sensing apparatus is to be exposed.

3. The method recited in claim 1, including the additional step of forming said raised contact means from a material having a temperature coefficient of expansion that is different from that of said first spacer means.

4. The method recited in claim 1 including the additional step of vapor depositing said first spacer means onto the end surface of said first optical fiber and around said raised contact means.

5. The method recited in claim 1, including the additional step of forming said optically flat surfaces by hemispherically terminating the first ends of said pair of optical fibers.

6. The method recited in claim 1, including the additional steps of applying a second spacer means around the outer periphery of the flat end surface of said second optical fiber, so that a central depression is formed within said second spacer means, and
   mating the first spacer means of said first optical fiber to the second spacer means of said second optical fiber and aligning said contact means with the depression of said second spacer means to form the Fabry-Perot gap therebetween.

7. The method recited in claim 6, including the additional step of vapor depositing said second spacer means around the periphery of the flat end surface of said second optical fiber.

8. A Fabry-Perot optical sensor for sensing a physical parameter, said sensor comprising:
   first and second optical fibers, each of said optical fibers having a first optically flat end thereof,
   source means to provide one of said optical fibers with a supply of light,
   raised contact means connected to the first end of said first optical fiber, and
   spacer means positioned on the first end of said first optical fiber and around said raised contact means, said spacer means being particularly dimensioned so that said contact means is recessed with respect thereto,
   said spacer means adapted to be mated to the first end of said second optical fiber to form a Fabry-Perot gap between said raised contact means and the first end of said second optical fiber, the optical characteristics of light being transmitted from said source means through said Fabry-Perot gap via said optical fibers being indicative of the parameter to be sensed.

9. The Fabry-Perot optical sensor recited in claim 8, wherein said raised contact means and said spacer means are formed from respective materials having different temperature coefficients of expansion.

10. The Fabry-Perot optical sensor recited in claim 8, wherein said raised contact means has a cylndrical configuration, the respective ends of said contact means and said second optical fiber that form said Fabry-Perot gap being in parallel alignment with one another.

11. The Fabry-Perot optical sensor recited in claim 8, wherein said source means comprises a source of white light interfaced with the second end of said first optical fiber in order to supply light to said Fabry-Perot gap.

12. The Fabry-Perot optical sensor recited in claim 8, further including photo-electric detection means interfaced with the second end of said second optical fiber and responsive to the optical signals that are transmitted thereto from said Fabry-Perot gap via said second optical fiber, so that an electrical equivalent of said physical parameter can be provided.

13. The Fabry-Perot optical sensor recited in claim 12, further including decoder means, said decoder means adapted to receive the electrical equivalent of the physical parameter from said photo-electric detector in order that a digital representation of said parameter can be provided.

14. An optical transducer for sensing a physical parameter, said transducer comprising:
   light source means,
   first and second light transmitting means,
   Fabry-Perot gap means formed between first ends of said first and second light transmitting means, each of said first ends having a partially reflective surface, said Fabry-Perot gap means receiving incident light signals from said source means via said first light transmitting means and supplying output light signals to said second light transmitting means,
   said Fabry-Perot gap means having a dimension that is sensitive to a parameter change, the spectral characteristics of the output light signals being transmitted through said Fabry-Perot gap means providing an indication of the dimension of said gap means and, accordingly, the physical parameter to be sensed, and
   means for detecting the spectral characteristics of said output light signals so as to provide the indication of said parameter.

15. An optical transducer for sensing a physical parameter, said transducer comprising:
   light source means,
   first and second light transmitting means,
   Fabry-Perot gap means formed between first ends of said first and second light transmitting means, said Fabry-Perot gap means receiving incident light signals from said source means via said first light transmitting means and supplying output light signals to said second light transmitting means, said Fabry-Perot gap means having a dimension that is sensitive to a parameter change, the optical characteristics of the light signals being transmitted through said Fabry-Perot gap means providing an indication of the dimension of said gap means and, accordingly, the physical parameter to be sensed, and spacer means positioned between the first ends of said first and second light transmitting means to form said Fabry-Perot gap means, said spacer means being fabricated from a material that is responsive to a parameter change for causing corresponding changes in the dimensions of said spacer means and said Fabry-Perot gap means, so as to alter the optical characteristics of the light signals being transmitted through said gap means.

16. The optical transducer recited in claim 15, wherein each of said first and second light transmitting means is an optical fiber, said optical fibers and said spacer means being fabricated from respective materials having different temperature coefficients of expansion.

17. The optical transducer recited in claim 15, wherein the first ends of said first and second light transmitting means are in substantially parallel alignment with one another.

* * * * *